United States Patent [19]

Graef et al.

[11] Patent Number: 4,649,763

[45] Date of Patent: Mar. 17, 1987

[54] MULTIPLE-SPEED, HYDROKINETIC TRANSMISSION

[75] Inventors: Kurt Graef, Pulheim; Egon Axt, Bechen/Pohl; Hans-Peter Wirtz, Cologne; Friedrich Lauscher, Kreuzau-Drove; Werner Pötzsch, Cologne; Peter Körfer, Hükelhoven; Paulus Sastrarahardja, Pulheim; Werner Croonen, Bergheim/Ahe; Josef Serf, Cologne, all of Fed. Rep. of Germany

[73] Assignee: Ford Motor Company, Dearborn, Mich.

[21] Appl. No.: 732,026

[22] Filed: May 8, 1985

[30] Foreign Application Priority Data

May 12, 1984 [DE] Fed. Rep. of Germany ....... 3417703

[51] Int. Cl.$^4$ ..................... F16H 57/10; F16H 57/04
[52] U.S. Cl. ........................................ 74/763; 74/762
[58] Field of Search ................. 74/688, 763, 759, 761, 74/765, 762, 731, 695

[56] References Cited

U.S. PATENT DOCUMENTS

| | | | |
|---|---|---|---|
| 3,252,352 | 5/1966 | General et al. | 74/645 |
| 3,584,520 | 6/1971 | Borman | 74/763 |
| 3,602,055 | 8/1971 | Hause | 74/763 |
| 3,706,240 | 12/1972 | Borneman et al. | 74/869 |
| 4,304,153 | 12/1981 | Moroto et al. | 74/759 |
| 4,387,607 | 6/1983 | Sakakibara | 74/763 |
| 4,400,998 | 8/1983 | Bookout et al. | 74/763 X |
| 4,455,890 | 6/1984 | Kuramochi et al. | 74/763 X |
| 4,484,494 | 11/1984 | Sakakibara | 74/763 X |
| 4,509,389 | 4/1985 | Vahratian et al. | 74/688 X |
| 4,512,212 | 4/1985 | Ishikawa | 74/762 |

Primary Examiner—Allan D. Herrmann
Assistant Examiner—John Malcolm White
Attorney, Agent, or Firm—Donald J. Harrington; Keith L. Zerschling

[57] ABSTRACT

Multiple-speed, hydrokinetic-mechanical change-speed gearbox controlled by an hydraulic control valve system for a motor vehicle comprising multiple ratio gearing and a simple planetary gear unit located between the hydrokinetic portion and the multiple ratio gearing.

2 Claims, 6 Drawing Figures

| MANUAL VALVE POSITIONS | | | FRICTION AND REACTION-ELEMENTS APPLIED | | | | | | | | |
|---|---|---|---|---|---|---|---|---|---|---|---|
| | | | LUCL | CL₁ | B₁ | OWC₁ | CL₂ | CL₃ | B₂ | B₃ | OWC₂ |
| P | PARK | | | | | | | | | | |
| R | REVERSE (FIG.1e) | | | ■ | | ■ | ■ | | | ■ | |
| N | NEUTRAL | | | | | | | | | | |
| DE | DRIVE ECONOMY (FIG.1a) | 1 | | | | ■ | | ■ | | | ■ |
| | (1b) | 2 | | | | ■ | | ■ | ■ | | |
| | (1c) | 3 | ■ | | | ■ | | ■ | | | |
| | (1d) | 4 | ■ | | | | ■ | ■ | | | |
| D | (1a) | 1 | | | | ■ | | ■ | | | ■ |
| | (1b) | 2 | | | | ■ | | ■ | ■ | | |
| | (1c) | 3 | ■ | | | ■ | | ■ | | | |
| 2 | 2ᴺᴰ GEAR (1g) | | | ■ | | ■ | | ■ | ■ | | |
| 1 | 1ˢᵀ GEAR (1f) | | | ■ | | ■ | | ■ | | ■ | |

FIG. 2

MULTIPLE-SPEED, HYDROKINETIC TRANSMISSION

GENERAL DESCRIPTION OF THE INVENTION

The invention relates to a multiple-speed, hydrokinetic-mechanical change-speed gearbox and hydraulic control valve system for motor vehicles.

A prior art multiple-speed, hydrokinetic-mechanical, change-speed gearbox for motor vehicles shown in U.S. Pat. No. 3,706,240 includes a hydrokinetic torque converter and multiple ratio planetary gearing of a so-called Simpson-type. Such gearing normally offers three forward ratios and a reverse ratio. The present invention retains the essential elements of the gearbox of the reference patent and offers in addition a fourth forward ratio. A simple planetary gear unit with a clutch and brake arrangement controlling it is added upstream of the Simpson-type gearing.

The gearbox of the present invention is provided with a central shaft between its input and output shafts in such a way that the turbine shaft, forming the input shaft of the gearing, is connected drivably to the ring gear of the added planetary gear unit, the sun gear of which is connected drivably to a brake drum. A brake band engages the brake drum and a multiple-disc clutch inside the drum connects the sun gear to the ring gear. The planetary gear carrier of the added planetary gear unit is connected drivably to the central shaft. The central shaft is connected to a clutch member that forms the input member of the Simpson-type gear system.

The simple planetary gear unit of the present invention is controlled in such a way that in the first three forward gears it acts as a speed reduction gear to reduce the effective speed ratio of the multiple-speed transmission thus making the transmission applicable for use with low-powered internal combustion engines with low torque and high rotational speeds.

In the fourth forward gear the sun gear of the added planetary gear set of the present invention is locked to provide an overdrive ratio in drive when the Simpson-type gearing is locked in a ratio of unity.

If it is assumed that the transmission of the present invention includes a hydrokinetic torque converter and a Simpson-type planetary gear transmission and that it is used with an internal combustion engines of a specific power range between 1.8 liter and 2.8 liter piston displacement, the torque transmitting components may be designed with a reduced capacity because of the effect of the simple planetary gear unit.

It is an object of the present invention to provide a four speed version of a hydrokinetic torque converter transmission with a Simpson-type gear system by adding a simple gear unit upstream of the Simpson-type gearing and wherein the fourth forward gear is designed as an overdrive in order to achieve savings in fuel. In addition, the invention includes a lockup clutch for the converter so that in the third and fourth gear ratios any slippage in the converter can be avoided above certain speeds. An example of such a lockup clutch is shown in U.S. Pat. No. 3,252,352.

A further object of the present invention is to improve the performance of the extended range gearbox in such a way that a pressure supply pump for the transmission can be designed with a low output pressure requirement even for the extended ratio range while maintaining its ability, without problems thereby arising, to supply the torque converter fluid feed circuit and the transmission lubricant flow circuit.

The turbine shaft forming the input shaft of the multiple ratio gearing is connected drivably by spline teeth to the planetary gear carrier, the sun wheel being connected by spline teeth and a connection member to a brake drum. A brake band engages the outer drum surface, and a multiple-disc clutch is located within the drum. The clutch locks the sun gear to the planetary gear carrier to lock the planetary gear unit. The ring gear of the planetary gear unit is connected by spline teeth to the central shaft, which is turn connected by spine teeth to the input member of the multiple ratio gearing by a clutch member. An overrunning clutch also is disposed between the central shaft and the hub of the planetary gear carrier. Locking of the added overdrive planetary gear unit in the direction of driving rotation is ensured in the shifting position "D" for the first, second and third gears ad for the reverse gear. An hydraulic servo apparatus need not be actuated for this purpose. A multiple-disc clutch provided between the sun gear and the planetary gear carrier is actuated only if an engine braking effect is desired; for example, while traveling downhill. The brake band then engages the brake drum connected to the sun gear only if the overdrive for gear unit 66 is in effect in the driving range "D".

The hydrokinetic torque converter is provided with a converter lockup clutch which can be engaged both in the third and in the fourth forward gear ratios depending upon speed and load. The lockup clutch is controlled by means of two reversible pressure fluid circuits including ducts formed between the input shaft and a hollow hub rigid with the housing, one of the ducts extending through radial and axial bores in the stator hub and transversely through the region of the roller arrangement of the overriding clutch of the stator. Larger flow ducts, which cause lower pressure losses, thus are made possible.

Friction losses in the higher gear ratios are reduced to a minimum by virtue of the fact that the bearing points of the change-speed gearing are provided in known manner with needle roller bearings and are supplied with lubrication oil through front, central and rear lubricating oil passages. Further, a branch duct of the central lubricating oil passage communicates with the rollers of the first overrunning roller clutch. An oil retaining disc throttles the outflow of the lubricating oil, on which the roller members float during coasting.

By virtue of the fact that the brake band of the overdrive servo is actuated by means of a force multiplying actuating lever, the overdrive servo pressure can be kept low and the servo itself can be of reduced size. The efficiency of the gearbox thus is increased on account of the lower power loss of the pressure fluid supply.

BRIEF DESCRIPTION OF THE FIGURES OF THE DRAWINGS

The invention is described in greater detail with reference to one embodiment explained in the accompanying drawings, in which:

FIG. 2 is a table designating the clutch and brake engagement and release pattern for the various gear ratios;

PARTICULAR DESCRIPTION OF THE INVENTION

Figure 1A:
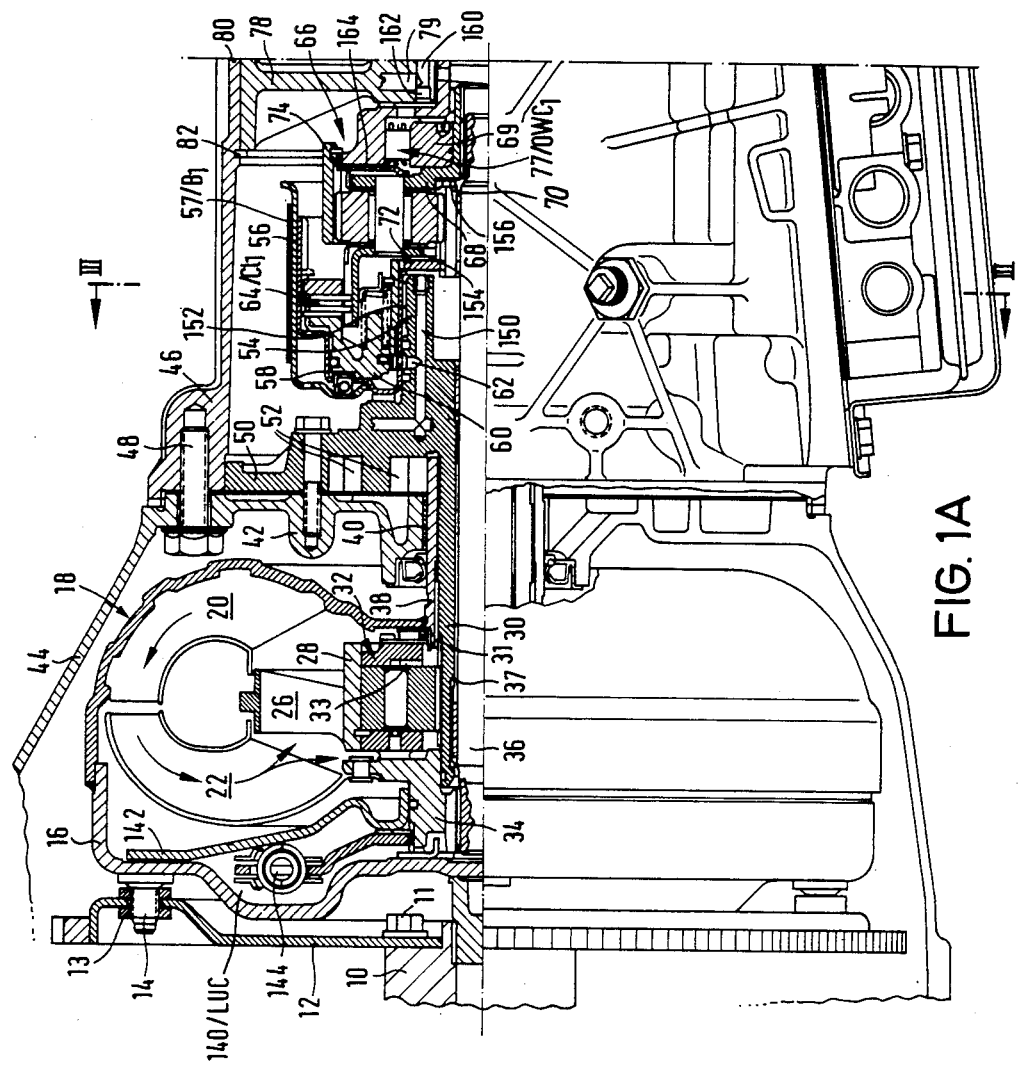
FIGS. 1A and 1B are a side view of a multiple-speed, hydrokinetic-mechanical, change-speed gearbox according to the invention, the upper half of which is illustrated in section.
Figure 1B:
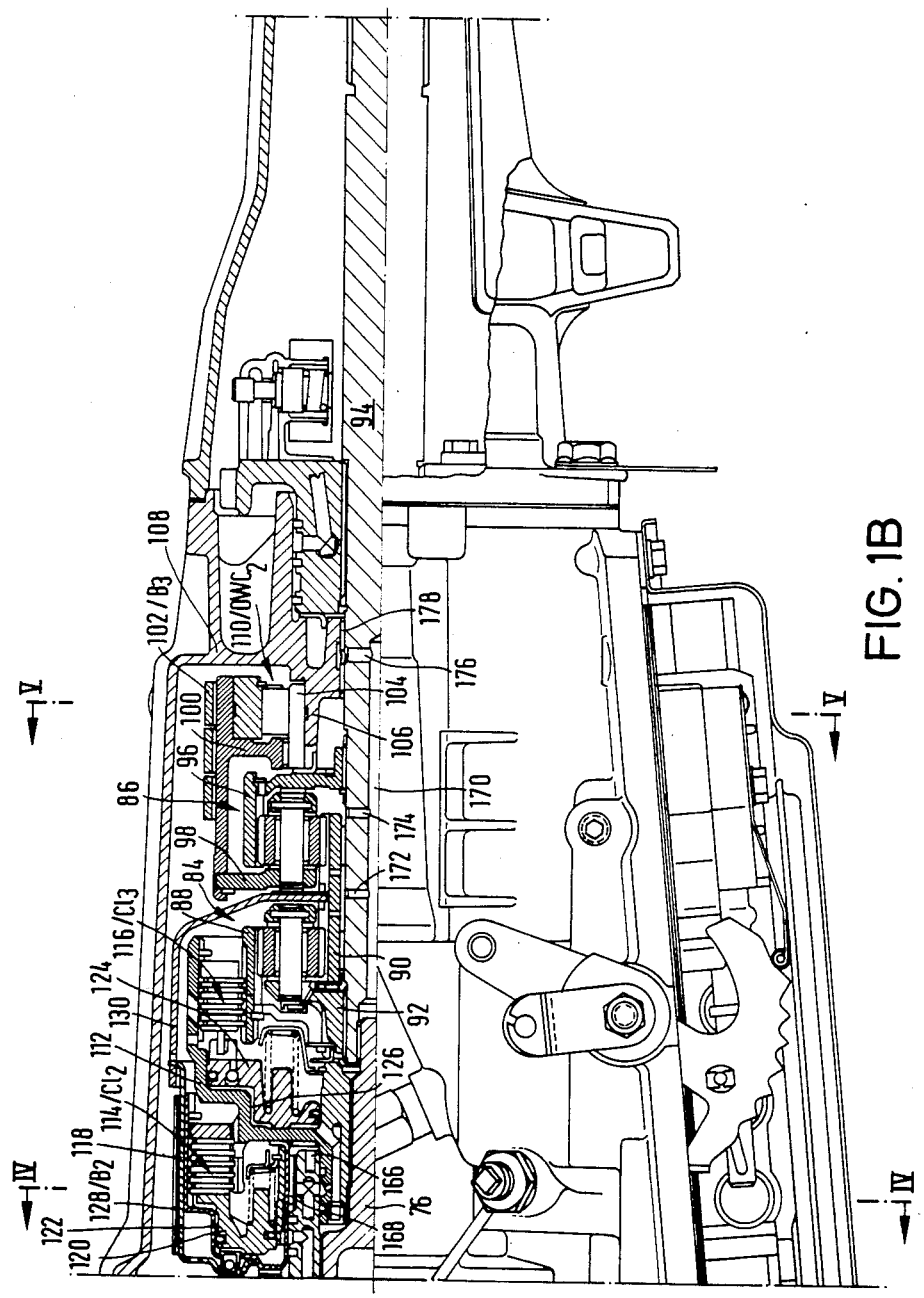

In FIG. 1, one end of the crankshaft of an internal combustion engine is designated by reference numeral 10. It is connected by bolts 11 to the center of a driving plate 12, the edge of which is secured to the driving sleeve 16 of a hydrokinetic torque converter 18 by means of nuts 13 on screw bolts 14. The hydrokinetic torque converter 18 consists in known manner of a pump 20, a turbine 22 and a stator 26, which are disposed in an annular, toroidal flow circuit. A converter stator 26 is supported in conventional manner by a hub 28 on a stationary hollow sleeve shaft 30 by means of an overrunning clutch 32. The turbine part 22 is connected by means of a turbine hub 34 to a turbine shaft 36, which forms the input shaft of the gearbox. The pump part 20 is supported by means of a pump hub 38 in a bearing opening 40 in a transverse wall 42, which forms part of the housing 44 of the torque converter.

A gearbox housing 46 is connected to the torque converter housing 44 by bolts 48. A pump housing 50 is connected to the transverse wall 42 and is formed in one piece with the stationary hollow hub 30.

The pump housing 50 contains pump gears 52 of a positive placement pump which supplies the fluid pressure for the hydraulic control valve system. The pump housing 50 further comprises a bearing member 54, on which is rotatably mounted a brake drum 56 which receives an annular cylinder 58 and an annular piston 60. The cylinder 58 can be acted upon with fluid pressure by way of a duct 62 in the bearing member 54.

The cylinder 58 and the piston 60 form the actuating servo for the first multiple-disc clutch 64/CL$_1$. The brake drum 56 is surrounded by brake band 57 and forms a first brake B$_1$.

A simple planetary gear set 66 added upstream comprises a planetary gear carrier 68 which is connected drivably to the turbine shaft 36 and which is formed by welding from two pressed sheet metal parts. Cylinder 58 is connected by a separate connecting member 72 to the teeth on sun gear 70. Ring gear 74 is directly connected by spline teeth to the central shaft 76.

By engaging the first clutch CL$_1$, which connects the planetary gear carrier 68 to the sun wheel 70, the planetary gear set 66 can be locked in the shifting positions "1, 2, 3 and R" in order to achieve an engine braking effect. In addition, the planetary gear set 66 is locked in the driving direction of rotation of the ring gear by an overrunning clutch 77 (OWC$_1$), which is disposed between an attachment on the central shaft 76 and an inner bearing race 69 connected to the planetary gear carrier 68. Clutch 77 is effective in the shifting position "D". By the application of the brake band 57(B$_1$) the planetary gear unit 66 becomes effective as a torque reduction gear unit thus making available the overdrive mode for the gear unit during operation in the forward drive range.

A transverse wall 78 is disposed in the gearbox housing 46 and is fixed in position by a shoulder 80 on one side and by a circlip 82 on the other side. The transverse wall 78 is provided with supply ducts 79 for distributing the pressure fluid.

The transverse wall 78 separates the overdrive planetary gear set 66 from the second gearing assembly inside the housing 46, in which second and third planetary gear sets 84 and 86 are disposed.

The planetary gear set 84 comprises a ring gear 88, a sun gear 90 and a planetary gear carrier 92 with planet pinions disposed thereon, the planetary gear carrier 92 being directly connected by spline teeth to the output shaft 94 of the gearbox. The planetary gear set 86 comprises a ring gear 96, a planetary gear carrier 98 with planet pinions disposed thereon and a sun gear 90 which forms a single part with the sun gear of the set 84. The planetary gear carrier 98 is connected drivably to a brake drum 100 surrounded by brake band 102 which forms a third brake B$_3$.

Brake drum 100 is supported by means of an overrunning clutch 110 on a stationary inner bearing race 104, which is rotatably mounted on a rigid projection 106 of the end wall 108 of the gearbox housing.

The central shaft 76 is directly connected to a clutch member 112 which forms the input member of the Simpson-type gear system and which supports clutch discs for second and third multiple-disc clutches 114 (CL$_2$) and 116 (CL$_3$). Clutch discs, which are connected to the ring gear 88, cooperate with the clutch discs on the clutch member 112 and establish a driving connection between the clutch member 112 and the ring gear 88.

Similary, the multiple-disc clutch 114 (CL$_2$) comprises clutch discs supported by the clutch member 112, and clutch discs supported by a brake drum 118. The drum 118 is connected to the common sun gear 90 of the two planetary gear sets by way of a drive shell 130.

The clutch discs on the clutch member 112 cooperate with the clutch discs on the brake drum 118 and permit a driving connection between the clutch member 112 and the common sun gear 90.

The clutch discs of the multiple-disc clutch 114(CL$_2$) are frictionally engaged by a piston 120 which is disposed in a cylinder 122 in the brake drum 118. The clutch discs of the multiple-disc clutch 116 (CL$_3$) are frictionally engaged by piston 124 which is disposed in an annular cylinder 126 in the clutch member 112.

A brake band 128 surrounds the brake drum 118 and forms a second brake B$_2$, by means of which the sun wheel 90 can be locked. Sun gear 90 is common to the two planetary gear sets and is connected to brake drum 118 by the drive sheel 130.

When the manual gearshift lever is moved to the shifting positions "1, 2 or R" for operation in the two lower forward gears or in reverse, the simple planetary gear unit 66 is locked. That is, during operation in first and second forward drive ratios and in reverse drive, gear set 66 is locked both by the engaged first clutch CL$_1$ and by the first overrunning clutch OWC$_1$. Torque then is transmitted from the turbine shaft by means of the locked planetary gear set 66 to the central shaft and from the latter to the input member of the Simpson-type gear unit both in the driving direction and in the coasting direction.

When the manual gearshift lever is moved to the shifting position "D", automatic shifting takes place.

In order to obtain the first gear ratio the Simpson-type gearing is driven by means of the engaged third clutch CL$_3$, the planetary gear carrier of the third set being locked by means of the third brake $B_3$ or the overrunning clutch 110 ($OWC_2$).

In order to obtain the second gear ratio the Simpson-type gearing continues to be driven by means of the third clutch $CL_3$. Instead of locking the planetary gear carrier of the third set, the sun gear 90 is locked by means of the second brake $B_2$.

In order to obtain the third direct gear ratio, the second clutch $CL_2$ is engaged and the second brake $B_2$ is released as the third clutch $CL_3$ remains applied. As a result, the second planetary gear set is locked, and in conjunction with the locked planetary set 66 a direct driving ratio is achieved.

In order to obtain the fourth gear the first brake $B_1$ is actuated, as a result of which the sun gear of gear unit 66 is locked. In this way the ring gear of the first set is overdriven and the first overrunning clutch $OWC_1$ is released. Because of the two engaged clutches $CL_2$ and $CL_3$, the Simpson-type gearing remains in its locked state.

Reverse drive is obtained by locking the first planetary gear set, as in first ratio operation. That is done as the clutch $CL_1$ or the overrunning clutch 77($OWC_1$) is activated. The Simpson-type gearing is driven by means of the second clutch $CL_2$, the planetary gear carrier of the third set being locked by means of the third brake $B_3$.

Between the driving sleeve 16 and the turbine and clutch hub 34 the hydrokinetic torque converter 18 is provided with a torque-converter lockup clutch 140(LVC), which comprises in known manner a clutch disc 142 in conjunction with a damper arrangement. An example of a lockup clutch of this type is shown in U.S. Pat. No. 3,252,352.

The torque-converter lockup clutch 140 can be engaged and disengaged by means of two reversible fluid pressure delivery circuits which include a central passage 37 formed between the input shaft 36 and the hollow sleeve shaft 30, connected to the housing, and by means of an annular duct 31 formed between the hollow hub 30 and the pump hub 38, which forms a hollow shaft. Duct 31 runs by way of radial passages 33 into the stator hub 28, and passes transversely through the region of the roller arrangement of the stator overrunning clutch 32 and thus ensures greater cross-flow. It causes also a reduction during coasting of the frictional losses of the overrunning stator clutch 32 on account of the floating of the roller members.

In the same way, in order to reduce the frictional losses, several bearing points of the change-speed gearbox are provided in known manner with needle roller bearings that are supplied with lubricating oil by way of front, central and rear lubricating oil ducts 150, 160 and 170, respectively. In this connection, the front lubricating oil duct system 150 primarily supplies the bearing 152 of the overdrive clutch and brake drum arrangement 56 to 64, the stop rings 154 of the planetary gear unit set 66, the axial support of the planetary gear carrier 68 and the needle roller bearing 156. A branch duct 162 of the central lubricating oil duct system 160 supplies the roller area of the overrunning clutch 77, an oil retaining disc 164 being disposed on the opposite side of the overrunning clutch in such a way that the discharge of the lubricating oil is throttled such that the roller member can float during coasting and thus the frictional loss is considerably reduced. A branch duct 166 primarily supplies the bearing 168 of the clutch cylinder brake drum arrangement of the forward gear clutch 144 to 122.

The rear lubricating oil duct system 170 supplies, by way of branch ducts 172, 174 and 176, the bearing of the common sun wheel 90 of the Simpson-type planetary gearing, the planet pinions of the Simpson-type gearing, the bearing 178 of the output shaft 94 and the rear overrunning clutch 110.

Figure 3:
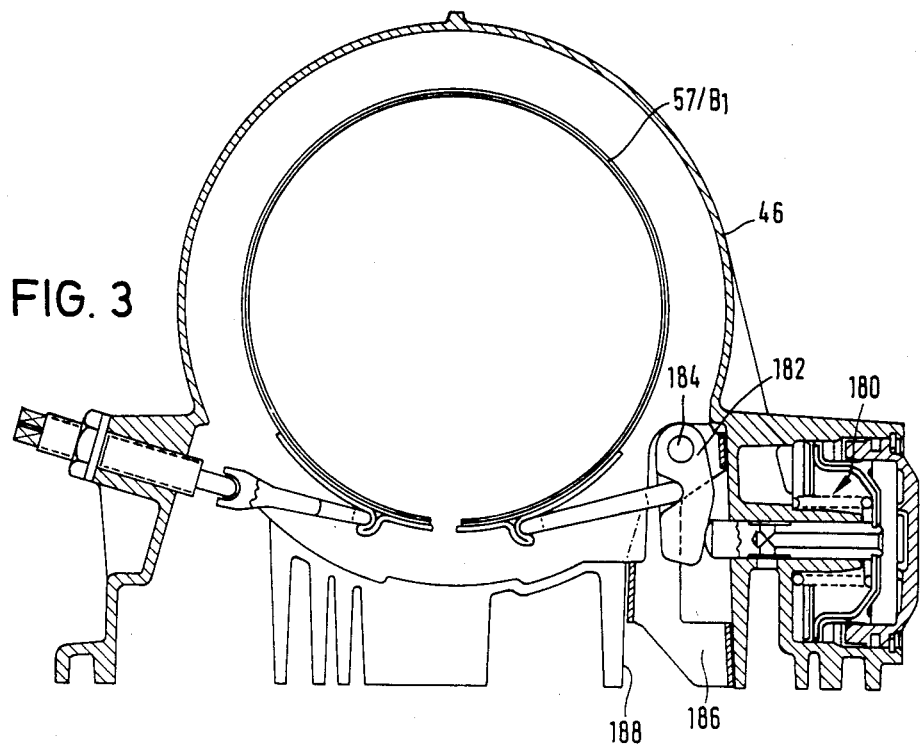
FIG. 3 is a section along section line III—III in FIG. 1A.

As shown in FIG. 3, the brake band 57 of the first brake $B_1$ is actuated by a servo 180, shown in FIG. 3. The size of servo 180 is reduced but its braking force is multiplied by an actuating lever 182 which permits a power ratio.

Figure 4:
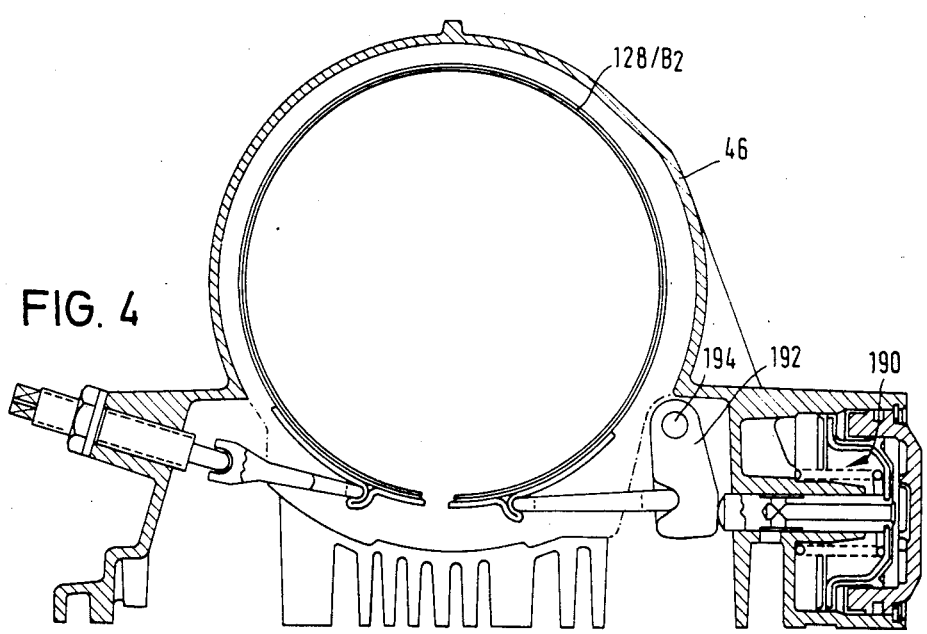
FIG. 4 is a section along section line IV—IV in FIG. 1B.

As shown in FIG. 4, the brake band 128 ($B_2$), which is provided for locking the common sun gear 90 of the Simpson-type planetary gearing is likewise actuated by a servo as shown at 190. That servo also can be made with a reduced size because of the force multiplication of lever 192.

Actuating lever 192 is disposed further to the rear in the gearbox housing 46 as viewed from the converter end or left end of the cross section, and the bores in the gearbox housing that are necessary for receiving pivot pin 194 for lever 192 can be made only if access from the left side is kept open. For this purpose the pivot pin 184 of the actuating lever 182 is placed further forward in the gearbox 46 with respect to the converter end and is disposed in an essentially U-shaped bearing block 186. Block 186 is punched from sheet metal and, only after the machining of the holder for the pin 194, is inserted into the holding pocket 188 provided in the gearbox housing 46.

Figure 5:
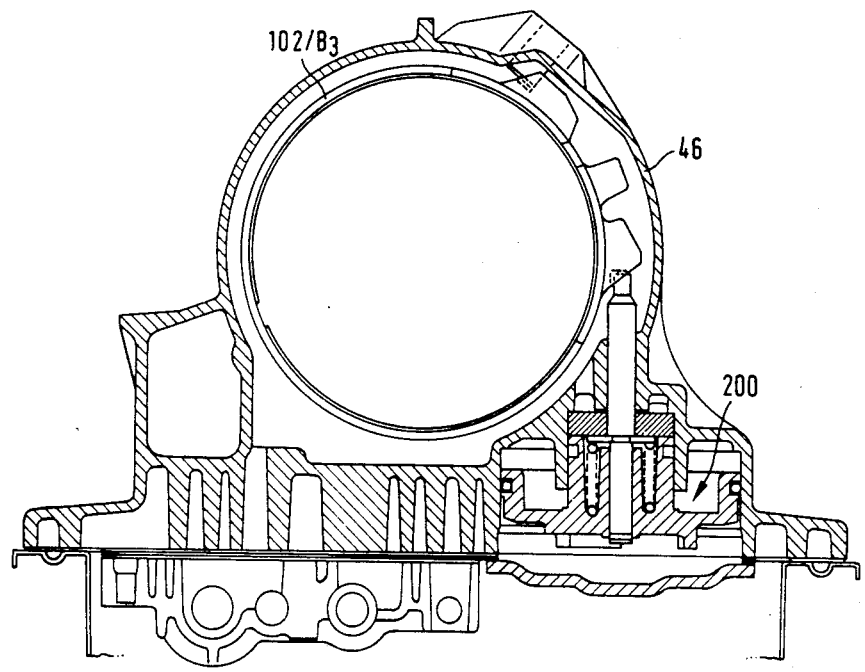
FIG. 5 is a section along section line V—V in FIG. 1B.

As shown in FIG. 5, the brake band 102 ($B_3$) is actuated by way of a somewhat larger servo 200 which is arranged for vertical movement in order to keep the gearbox narrow laterally.

Fluid pressure conduits can be formed in the labyrinth of the control housing in order to direct line pressure ducts and signal pressure to a valve bore in which electromagnetically controlled pressure transducer valves can be inserted from the outside. These valves indicate a throttle pressure signal that is dependent upon torque a the governor pressure signal that is dependent upon the velocity of travel. These signals are established electrohydraulically by means of a microprocessor instead of by means of a conventional hydraulic valve mechanism. In this way a conventional throttle pressure valve connected to the engine throttle by a mechanical linkage and the governor pressure valve disposed on the output shaft may be dispensed with.

We claim:

1. In a multiple speed hydrokinetic power transmission mechanism comprising a housing and multiple ratio planetary gearing in said housing, a hydrokinetic torque converter, a torque output element of said planetary gearing being connected to a driven member and the impeller of said torque converter being connected to a driving member;

a simple planetary gear unit disposed between said converter and the multiple ratio gearing and arranged on a common axis with said converter and said multiple ratio gearing, said simple planetary gear unit comprising a sun gear, a ring gear, planet pinions and a planet carrier supporting said pinion in meshing engagement with said ring and sun gears;

brake means including a brake drum for anchoring selectively said sun gear and friction clutch means located with the drum for said brake means for selectively connecting said sun gear with said carrier;

a turbine shaft connecting said turbine with said carrier, overrunning clutch means for connecting said carrier to said ring gear when said brake means is released thereby establishing a drive ratio of unity for said simple planetary ger unit, said friction clutch means establishing torque transfer between said turbine shaft and said multiple ratio gear unit in both directions and said overrunning clutch establishing torque transfer therebetween in one direction only;

a bearing support wall of said housing between said multiple ratio planetary gearing and said simple planetary gearing, said overrunning clutch means being located between said support wall and said simple planetary gear unit and said friction clutch means and said brake drum being located between said converter and said simple planetary gear unit, thereby reducing the overall axial dimension of said mechanism;

said planetary gearing having an intermediate torque transfer shaft, multiple friction clutches for connecting selectively said torque transfer shaft with separate torque input elements of said gearing; and said overrunning clutch having an outer race connected to one end of said torque transfer shaft, an inner race connected to said turbine shaft whereby a torque flow path through said overrunning clutch is established thus bypassing the sun and ring gears and the planet pinions of said simple planetary gear unit when said brake means is released.

2. The combination as set forth in claim 1 wherein said overrunning clutch includes an outer race connected to the ring gear of said simple planetary gear unit, an inner race connected to the carrier of said simple planetary gear unit and clutch rollers between said races, a lubrication oil passage in said bearing support wall communicating directly with the region occupied by said rollers between said races whereby said rollers float on a hydraulic oil film when said races overrun, one with respect to the other, thereby reducing frictional power loss.

* * * * *